(12) United States Patent
Locke et al.

(10) Patent No.: US 11,598,527 B2
(45) Date of Patent: Mar. 7, 2023

(54) REDUCING NOISE FROM A COMBUSTOR OF A GAS TURBINE ENGINE

(71) Applicant: UNITED TECHNOLOGIES CORPORATION, Farmington, CT (US)

(72) Inventors: Justin M. Locke, Tolland, CT (US); Dennis Moura, South Windsor, CT (US); Duane McCormick, Colchester, CT (US); Scott A. Liljenberg, Wethersfield, CT (US); Theodore Strickland, Madison, CT (US); William Proscia, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 741 days.

(21) Appl. No.: 15/177,825

(22) Filed: Jun. 9, 2016

(65) Prior Publication Data

US 2017/0356654 A1   Dec. 14, 2017

(51) Int. Cl.

| F23R 3/28 | (2006.01) |
|---|---|
| F23D 11/38 | (2006.01) |
| F23R 3/34 | (2006.01) |
| F23K 5/06 | (2006.01) |
| F23R 3/14 | (2006.01) |

(Continued)

(52) U.S. Cl.
CPC ............. *F23R 3/28* (2013.01); *F23D 11/38* (2013.01); *F23K 5/06* (2013.01); *F23R 3/06* (2013.01); *F23R 3/12* (2013.01); *F23R 3/14* (2013.01); *F23R 3/346* (2013.01); *F23R 3/50* (2013.01);

(Continued)

(58) Field of Classification Search
CPC ...... F23R 3/25; F23R 3/06; F23R 3/12; F23R 3/14; F23R 3/346; F23R 3/50; F23R 2900/00014; F23D 11/38; F23C 7/004
See application file for complete search history.

(56) References Cited

U.S. PATENT DOCUMENTS

| 4,297,093 A * | 10/1981 | Morimoto ............... F23C 7/004 |
|---|---|---|
| | | 431/10 |
| 6,935,117 B2 * | 8/2005 | Cowan .................. F23D 17/002 |
| | | 60/742 |

(Continued)

FOREIGN PATENT DOCUMENTS

| DE | 10205839 | 8/2003 |
|---|---|---|
| EP | 2423598 | 2/2012 |

(Continued)

OTHER PUBLICATIONS

Translation WO 2007113130 (Year: 2007).*

(Continued)

*Primary Examiner* — Arun Goyal
(74) *Attorney, Agent, or Firm* — Snell & Wilmer L.L.P.

(57) ABSTRACT

A method of reducing noise from a combustor of a gas turbine engine includes the steps of establishing a maximum noise limit that may be for a particular frequency range. A primary fuel flow percentage, which may be emitted from a fuel nozzle arrangement having various groupings of simplex and duplex nozzles, is then established. An immersion depth measured between an aft rim of a swirler and a distal tip of the fuel nozzles may then be reduced thereby reducing the noise amplitude.

19 Claims, 4 Drawing Sheets

(51) Int. Cl.
*F23R 3/06* (2006.01)
*F23R 3/12* (2006.01)
*F23R 3/50* (2006.01)

(52) U.S. Cl.
CPC ............... *F23R 2900/00014* (2013.01); *F23R 2900/03042* (2013.01)

(56) References Cited

U.S. PATENT DOCUMENTS

| | | | | |
|---|---|---|---|---|
| 2008/0072605 | A1* | 3/2008 | Hagen | F23R 3/34 60/776 |
| 2013/0125556 | A1* | 5/2013 | Hoke | F02C 7/228 60/773 |
| 2013/0199200 | A1* | 8/2013 | Hoke | F02C 7/22 60/776 |
| 2014/0083111 | A1 | 3/2014 | Gregg | |
| 2014/0090394 | A1* | 4/2014 | Low | F23R 3/28 60/776 |

FOREIGN PATENT DOCUMENTS

| | | | |
|---|---|---|---|
| EP | 2597285 | 5/2013 | |
| WO | 2007113130 | 10/2007 | |
| WO | WO-2007113130 A1 * | 10/2007 | ................ F23C 5/02 |

OTHER PUBLICATIONS

EP Search Report dated Oct. 25, 2017 in EP Application No. 17174828.8.
European Office Action, European Office Action dated Nov. 8, 2018 in Application No. 17174828.8.
European Patent Office, European Summons to Attend Oral Proceedings dated Dec. 9, 2019 in Application No. 17174828.8.

* cited by examiner

REDUCING NOISE FROM A COMBUSTOR OF A GAS TURBINE ENGINE

FIELD

The present disclosure relates to a combustor of a gas turbine engine and, more particularly, to a method of reducing noise from the combustor.

BACKGROUND

The present disclosure relates to a combustor of a gas turbine engine and, more particularly, to a method of reducing noise from the combustor.

Gas turbine engines, such as those that power modern commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

It remains desirable for gas turbine engine manufacturers to develop combustor configurations that reduce emissions and/or noise with improved operational efficiencies.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A combustor is disclosed. The combustor may have a fuel nozzle. The fuel nozzle may have a distal tip. The distal tip may include a tubular portion, a distal portion, and a conical portion concentrically orientated and axially disposed between the tubular portion and distal portion. The distal tip may include a plurality of fuel spray apertures circumferentially spaced from one another and communicating through a conical portion and configured to produce a fuel spray into a combustion chamber. The distal tip may include an immersion depth measured between the distal portion of the distal tip and the aft most rim of the swirler, wherein the immersion depth is less than 0.500 inches. In various embodiments, the fuel spray apertures are angled at least partially radially outward and at least partially axially along a centerline of the fuel nozzle. Moreover, the fuel nozzle may include a distal aperture communicating through a planar portion of the distal tip and configured to produce a fuel spray along the centerline of the fuel nozzle.

A method of designing a low noise turbine engine combustor is disclosed. The method includes establishing a maximum noise limit, establishing a primary fuel flow percentage, and reducing an immersion depth measured between an aft rim of a swirler and a distal tip of a fuel nozzle until the noise generated drops below the maximum noise limit. The method further includes wherein the primary fuel flow percentage is established for low engine power conditions. The primary fuel flow percentage may be about less than twenty-five percent.

The method may also include a step of increasing the primary fuel flow percentage to further reduce combustor noise. The combustor may have an arrangement of simplex and duplex nozzles. In various embodiments reducing the immersion depth at least partially desensitizes the combustor against other noise producing factors including primary fuel flow. In various embodiments the immersion depth is less than 0.500 inches. In various embodiments, the immersion depth is less than 0.350 inches. Moreover, in various embodiments, the noise limit may be equal to or less than one percent of a combustor amplitude. The primary fuel flow may come from the duplex nozzles.

A method of reducing noise from a combustor of a gas turbine engine operating at low power conditions is disclosed. The method may include maximizing primary fuel flow and minimizing an immersion depth measured between an aft rim of a swirler and a distal tip of a fuel nozzle. In various embodiments, a primary fuel flow percentage is about less than twenty-five percent. In various embodiments, the combustor has an arrangement of simplex and duplex nozzles. Reducing the immersion depth may at least partially desensitize the combustor against other noise producing factors including primary fuel flow. In various embodiments the immersion depth is less than 0.500 inches. In various embodiments, the combustor noise is measured for tones falling between a range of about 200 Hz to 400 Hz. A maximum noise limit may be equal to or less than one percent of a combustor amplitude. The primary fuel flow may flow from the duplex nozzles.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
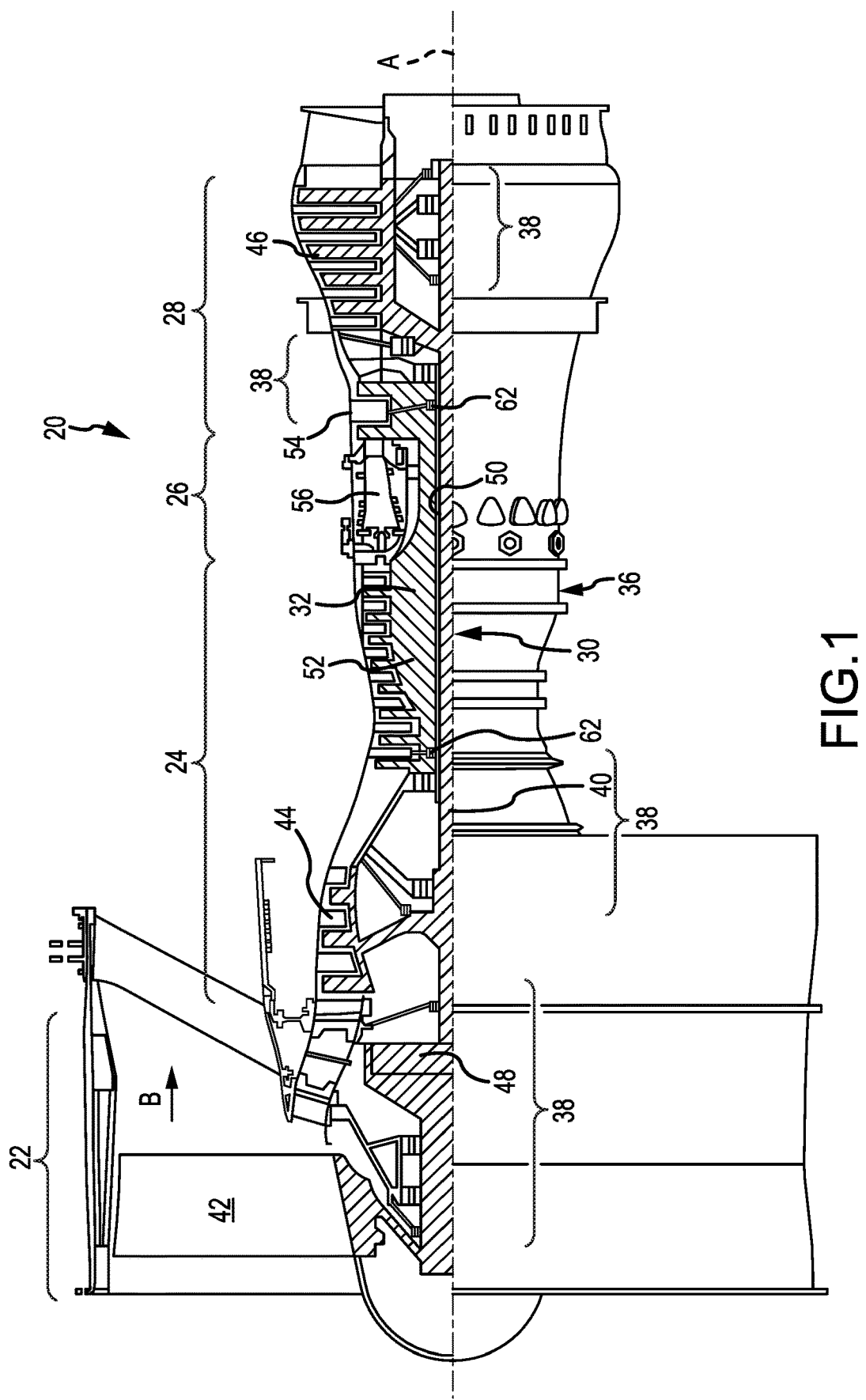
FIG. 1 is a schematic cross-section of a gas turbine engine.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

In accordance with various aspects of the disclosure, apparatuses, systems and methods are described for providing a distributed fuel injection in connection with an aircraft engine. In various embodiments, a gas turbine engine may exhibit a tendency to generate tones (e.g., sound having one or more frequency and/or amplitude). For instance, the fuel exiting fuel nozzles may form a film on a swirler surface with a thickness or other properties that allows airflow perturbations to couple with fuel film causing unsteady heat release which can then amplify the natural frequency of the combustor causing a tone. Also, the fuel exiting fuel nozzles may insufficiently couple with an airflow so that the lack of mixing and travel to the swirler surface inhibits anchoring of a flame to the surface, causing flame stability issues which can couple with a natural frequency of the combustor and also cause tones.

The combustor section may have an annular wall assembly having inner and outer shells that support respective inner and outer heat shielding liners. The liners may be comprised of a plurality of floating heat shields or panels that together define an annular combustion chamber. An annular cooling cavity is defined between the respective shells and liners for supplying cooling air to an opposite hot side of the panels through a plurality of strategically placed effusion holes. Impingement holes are located in the shell for supply cooling air from an outer air plenum and into the cavity. The effusion holes are generally orientated to create a protective blanket, or, air film over the hot side of the panels, thereby protecting the panels from the hot combustion gases in the chamber.

A forward assembly or bulkhead of the combustor generally supports a plurality of circumferentially spaced swirlers that each receive a fuel nozzle that projects rearward and toward the combustion chamber. Fuel is controllably supplied by each nozzle and compressed air generally flows between the swirler and nozzle and into the combustion chamber. The combination of the nozzle and swirler facilitates mixing of the fuel and air for combustion in the chamber.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The engine 20 generally includes a low spool 30 and a high spool 32 mounted for rotation about a central, longitudinal, engine axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In various non-limiting examples, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as thrust specific fuel consumption (TSFC). TSFC is an industry standard parameter of fuel consumption per unit of thrust.

Fan pressure ratio is the pressure ratio across a blade of the fan section 22 without the use of a fan exit guide vane system. The low fan pressure ratio according to one, non-limiting, embodiment of the example gas turbine engine 20 is less than 1.45. low corrected fan tip speed is the actual fan tip speed divided by an industry standard temperature correction of (T/518.7)0.5 in which "T" represents the ambient temperature in degrees Rankine. The low corrected fan tip speed according to a non-limiting embodiment of the example gas turbine engine 20 is less than about 1,150 feet per second (351 meters per second).

Figure 2:
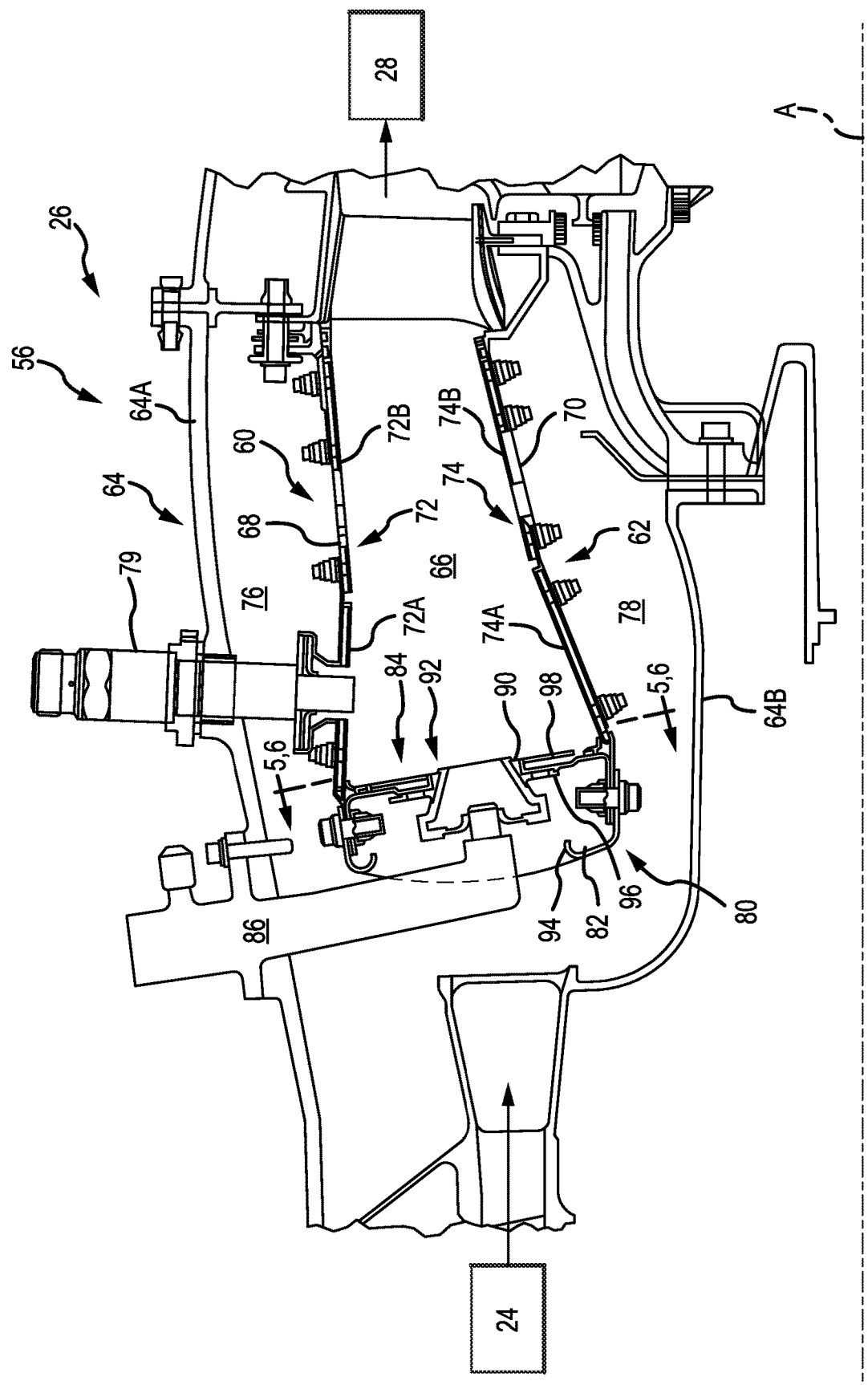
FIG. 2 is a cross-section of a combustor section.

Referring to FIG. 2, the combustor section 26 generally includes a combustor 56 with an outer combustor wall assembly 60, an inner combustor wall assembly 62 and a diffuser case module 64 that encases assemblies 60, 62. The outer combustor wall assembly 60 and the inner combustor wall assembly 62 are radially spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit. It should be further understood that the disclosed cooling flow paths are but an illustrated embodiment and should not be limited.

The combustion chamber 66 contains the combustion products that flow axially toward the turbine section 28. Each combustor wall assembly 60, 62 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a plurality of forward panels 72A and a plurality of aft panels 72B that line the outer shell 68. A plurality of forward panels 74A and a plurality of aft panels 74B also line the inner shell 70. At least one igniter 79 is generally located at and projects through the forward panel 72A to initially ignite a blended fuel-air mixture. It should be appreciated that the liner array may alternatively include but a single panel rather than the illustrated axial forward and axial aft panels.

The combustor 56 further includes a forward assembly 80 immediately downstream of the compressor section 24 to receive compressed airflow therefrom. The forward assembly 80 generally includes an annular hood 82, a bulkhead assembly 84, and a plurality of swirlers 90 (one shown) that are circumferentially spaced from one-another. Each swirler 90 is circumferentially aligned with one of a plurality of fuel nozzles 86 (one shown) and a respective one of a plurality of hood ports 94. The bulkhead assembly 84 includes a bulkhead support shell 96 secured to the combustor walls 60, 62, and a liner that may have a plurality of circumferentially distributed bulkhead heat shields or panels 98 secured to the bulkhead support shell 96 around each of a respective swirler opening 92. The bulkhead support shell 96 is generally annular and the plurality of circumferentially distributed bulkhead panels 98 are segmented, typically one to each fuel nozzle 86 and swirler 90.

The annular hood 82 extends radially between, and is secured to, the forwardmost ends of the combustor wall assemblies 60, 62. Each one of the plurality of circumferentially distributed hood ports 94 receives a respective one of the plurality of fuel nozzles 86 and facilitates the direction of compressed air into the forward end of the combustion chamber 66 through the swirler opening 92. Each fuel nozzle 86 may be secured to the diffuser case module 64 and projects through one of the hood ports 94 into the respective swirler opening 92.

The forward assembly 80 introduces core combustion air into the forward section of the combustion chamber 66 while the remainder enters the outer annular plenum 76 and the inner annular plenum 78. The plurality of fuel nozzles 86 and adjacent structure generate the blended fuel-air mixture that supports stable combustion in the combustion chamber 66.

Figure 3:
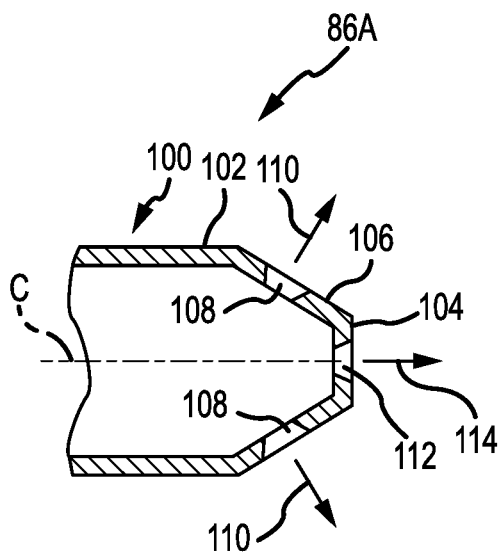
FIG. 3 is a partial cross section of duplex fuel nozzle tip of the combustor section.
Figure 4:
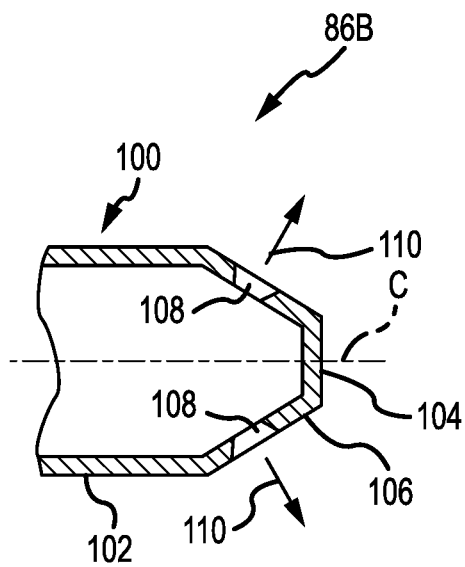
FIG. 4 is a partial cross section of a simplex fuel nozzle tip of the combustor section.

Referring to FIGS. 3 and 4, the forward assembly 80 may utilize a variety of structurally different fuel nozzles 86 for varying the fuel-air mixture at different circumferential locations within the annular combustion chamber 66 to control fuel burn, temperature profiles and combustor noise. For example, the plurality of fuel nozzles 86 may include at least one duplex fuel nozzle 86A and at least one simplex fuel nozzle 86B. A distal tip 100 of the nozzle 86 generally projects along a centerline C, and includes a generally tubular portion 102, a distal or planar portion 104, and a conical or frustum portion 106 concentrically orientated and axially disposed between the tubular and distal portions 102, 104.

Both of the duplex and simplex fuel nozzles 86A, 86B may have a plurality of fuel spray apertures or orifices 108 communicating through the conical portion 106 of the distal tip 100 for producing a secondary fuel spray (see secondary fuel spray 110) generally into the combustion chamber 66. The apertures 108 may be circumferentially spaced from one another and are generally angled at least partially radially outward from, and also at least partially axially along the centerline C. In various embodiments, the aperture 108 may be singular and generally annular or circular in shape (i.e. circumferentially continuous). The duplex fuel nozzle 86A may further have at least one distal aperture or orifice 112 communicating through the planar portion 104 of the tip 100 for discharging a cone-like, primary, fuel spray (see arrow 114) in an axial direction with respect to centerline C. In contrast, the simplex fuel nozzle 86B may have no apertures in the distal portion 104.

Figure 5:
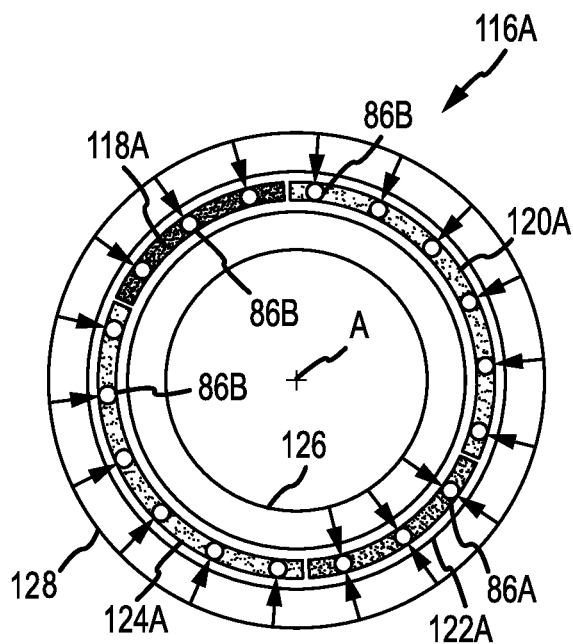
FIG. 5 is a cross section of the combustor section illustrating an arrangement of fuel nozzles taken in the direction of arrows 5-5 in FIG. 2.

Referring to FIGS. 3 through 5, in various embodiments, fuel nozzle arrangement 116A is illustrated having eighteen fuel nozzles 86 with each nozzle being circumferentially spaced from the next adjacent nozzle, and the spacing between nozzles may be substantially equal to the next spacing. Arrangement 116A may have four nozzle groupings 118A, 120A, 122A, 124A aligned circumferentially with one another. Grouping 118A may be circumferentially located between groupings 120A, 124A, and may have three simplex nozzles 86B. Grouping 120A may be circumferentially located between groupings 118A, 122A, and may have six simplex nozzles 86B. Grouping 122A may be circumferentially located between groupings 120A, 124A, and may have three duplex nozzles 86A. And, grouping 124A may be circumferentially located between groupings 118A, 122A, and may have six simplex nozzles 86B.

The primary fuel flow or spray 114 may be supplied to the duplex nozzles 86A via a primary manifold 126 and the secondary fuel flow or spray 110 may be supplied to the duplex and simplex nozzles 86A, 86B via a secondary manifold 128. Fuel supplied to the manifolds 126, 128 and/or fuel pressure within the manifolds may be controlled through any variety of means typically known in the art.

During low power operating conditions of the engine 20, the primary manifold 126 may be provided with a higher fuel pressure than the secondary manifold 128 to drive a fuel flow distortion. The increased fuel pressure drop (and fuel flow) increases the overall (primary plus secondary) fuel flow (for instance, mass over time and/or volume over time) to the duplex nozzles 86A relative to the simplex nozzles 86B. Thus, the duplex nozzles 86A generate the relatively high fuel-air ratio mixtures (relative to the simplex nozzles 86B) and the simplex nozzles 86B provide the relatively low fuel-air ratio mixtures (relative to the duplex nozzles 86A). The varied fuel-air ratio mixtures may partially dampen tangential and axial pressure waves within the combustor 56 to, in-part, control combustor tones and enhance combustor stability. At low power conditions, fuel supply pressure may generally be around 100 psi (689.5 kPa), with an approximate 50 to 100 psi (about 344.7 to about 1034 kPa) difference between the duplex and simplex nozzles 86A, 86B. It should be appreciated that "low power" as defined herein may include moderate power such as that required for approach conditions and a margin above at least partially into a cruise condition.

At non-low power operating conditions of the engine 20, fuel pressure may be about 1200 psi (about 8273 kPa) and the primary and secondary manifolds 126, 128 may receive equalized flow such that the duplex and simplex nozzles 86A, 86B generate a symmetrically uniform fuel-air ratio throughout the combustor 56. It should be appreciated that "non-low power" as defined herein may include cruise power conditions and above such as a take-off flight condition.

Figure 6:
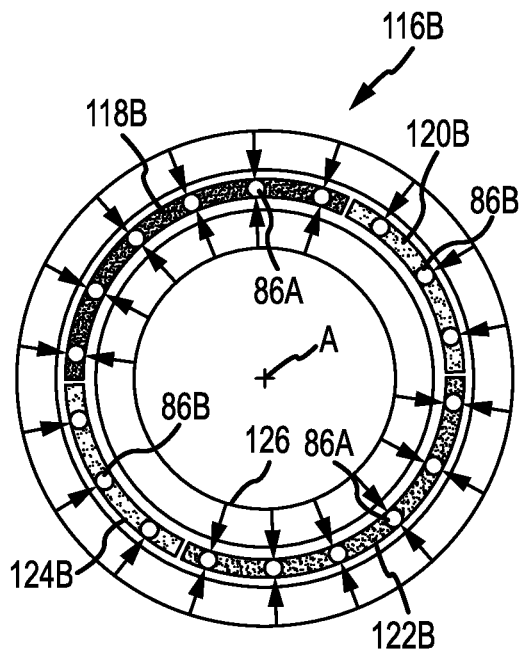
FIG. 6 is a cross section of the combustor section illustrating a second embodiment of an arrangement, and taken in the direction of arrows 6-6 in FIG. 2.

Referring to FIGS. 3, 4 and 6, another, non-limiting, example of a fuel nozzle arrangement 116B is illustrated having eighteen fuel nozzles 86 with each nozzle being circumferentially spaced from the next adjacent nozzle, and the spacing between nozzles may be substantially equal to the next spacing. Arrangement 116B may have four nozzle groupings 118B, 120B, 122B, 124B aligned circumferentially with one another. Grouping 118B may be circumferentially located between groupings 120B, 124B, and may have six duplex nozzles 86A. Grouping 120B may be circumferentially located between groupings 118B, 122B, and may have three simplex nozzles 86B. Grouping 122B may be circumferentially located between groupings 120B, 124B, and may have six duplex nozzles 86A. And, grouping 124B may be circumferentially located between groupings 118B, 122B, and may have three simplex nozzles 86B. It is further contemplated and understood that either or both arrangements 116A, 116B may have a different number of fuel nozzles 86 than illustrated, with a different number of groupings that may be characterized by different types of fuel nozzles and not necessarily simplex and duplex designs.

Figure 7:
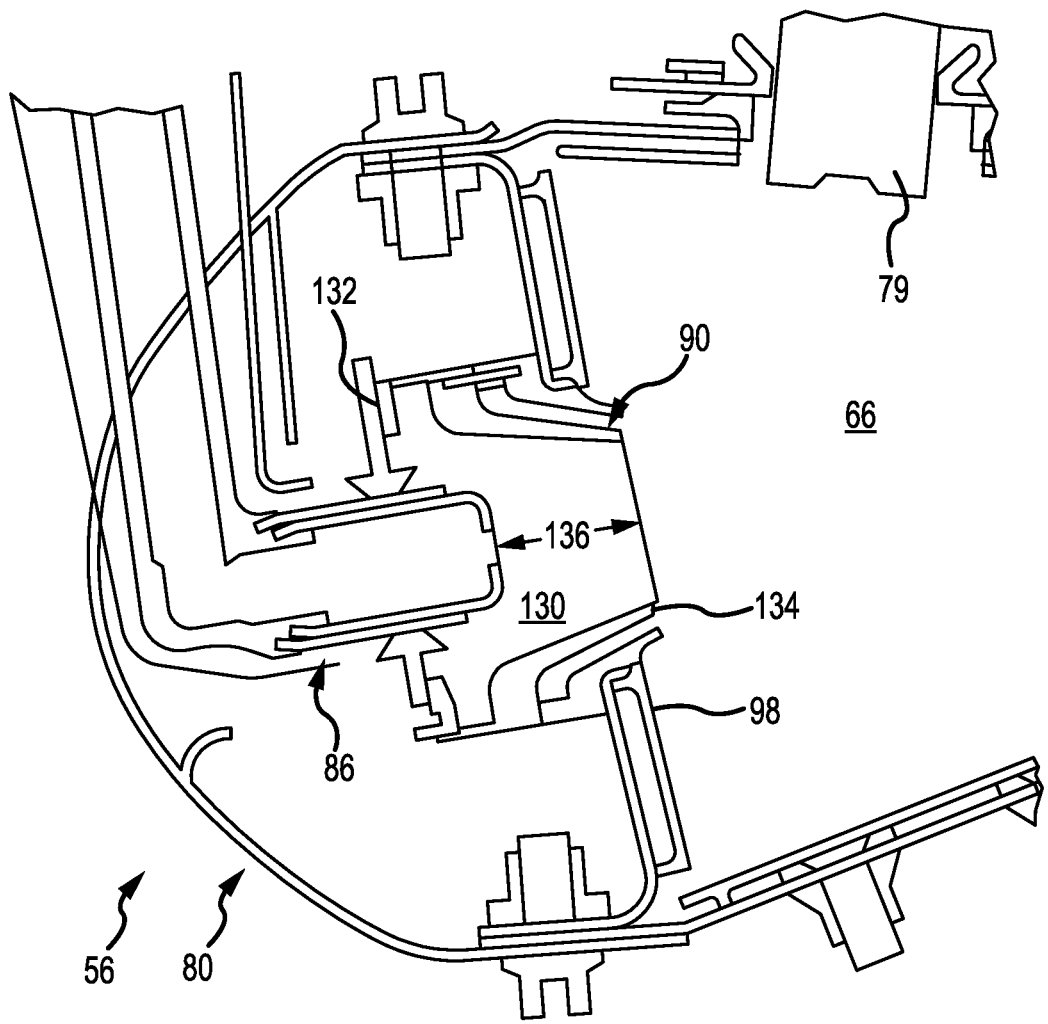
FIG. 7 is an enlarged, partial, cross section of the combustor section.

Referring to FIGS. 3 and 7, the distal tip 100 of each fuel nozzle 86 (a duplex fuel nozzle 86A being illustrated) projects along the centerline C and into a surrounding, cone-shaped, cavity 130 defined by the swirler 90 that converges toward the centerline C is a downstream direction. The cavity 130 is in direct fluid communication with and located upstream of the combustion chamber 66. The distal tip 100 deposits the secondary and primary fuel sprays 110, 114 into the cavity 130 where the fuel initially mixes with the compressed air and is expelled into the combustion chamber 66 for continued mixing and combustion.

The swirler 90 spans axially with respect to centerline C and between forward and aft (i.e. upstream and downstream) rims 132, 134 of the swirler. The nozzle 86 is axially orientated to the swirler 90 by an immersion depth (see immersion depth 136) measured between the distal portion 104 of the nozzle tip 100 and the downstream (e.g., the aft most, relative to the centerline C) rim 134 of the swirler 90.

In accordance with the principles discussed herein, combustor noise, at low power operating conditions, can be minimized by reducing immersion depth 136 and/or by increasing the percent of primary fuel flow 114. In various embodiments, the significant difference between the arrangements 116A, 116B (as two, non-limiting examples), is an indication that most, if not all, other arrangements of various grouping of duplex and simplex nozzles 86A, 86B will generally follow the same noise abatement trends. For instance, an immersion depth 136 (i.e. measured between the swirler 90 and the nozzle tip 100), versus combustor noise amplitude may follow a trend. In various embodiments, the immersion depth 136 may be selected from between about 0.250 inches to about 0.500 inches (6.35 mm to 12.70 mm), where the term "about" in this context only may refer to +/−0.05 inches. Moreover, the immersion depth may be expressed as a ratio of immersion depth over swirler axial length. A maximum goal limit for combustor noise amplitude may be generally dictated by governmental regulations and the immersion depth may be selected to meet a specified regulation. In various embodiments, an immersion depth comprises less than or equal to about 0.500 inches (12.70 mm), where the term "about" in this context only may refer to +/−0.05 inches.

Moreover, in various embodiments, such as for an arrangement 116A having a primary fuel flow 114 of about 2.5% of total flow, an immersion depth 136 of about 0.350 inches (8.89 mm) or less may be desirable. Moreover, for arrangement 116A having a primary fuel flow 114 of about 5% of total flow, an immersion depth 136 of about 0.360 inches (9.14 mm) or less may be desirable. Moreover, for the arrangement 116B having a primary fuel flow 114 of about 15%, an immersion depth 136 of about 0.390 inches (9.91 mm) or less may be desirable. Similarly, for an arrangement 116B having a primary fuel flow 114 of about 25%, it may be generally desirable to maintain an immersion depth 136 of about 0.500 inches (12.70 mm) or less.

Furthermore, the engine speed verse combustor amplitudes for tones ranging from about 200 Hz to 400 Hz may be of relevance to selecting immersion depths. In general, engine low power may fall within a range of about 2000 to 3000 rpm; engine mid power may fall within a range of about 3000 to 6500 rpm; and engine high power is generally denoted by 6500 rpm's or higher. At engine low power conditions for tones of 200 Hz to 400 Hz, combustor amplitude may be reduced by a factor such as about fifteen times by decreasing immersion depth and increasing percent of primary fuel flow according to the principles herein. At engine mid power conditions, combustor amplitude may be increased by a factor of about two, and at engine high power conditions combustor amplitude is substantially the same.

Still furthermore, the engine speed verse combustor amplitudes for tones ranging from about 400 Hz to 800 Hz may also be of relevance to selecting immersion depths. At engine low power and mid power conditions for tones of 400 Hz to 800 Hz, combustor amplitudes may remain substantially such that decreasing immersion depth and increasing the percent of primary fuel flow has little effect. However, at engine high power conditions combustor amplitude may decrease by a factor of about twelve when the percent of primary fuel flow 114 is increased and the immersion depth 136 is decreased.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

What is claimed is:

1. A combustor comprising a plurality of swirlers that are circumferentially spaced from one another and a corresponding plurality of fuel nozzles such that each swirler of the plurality of swirlers is axially aligned with a different fuel nozzle of the plurality of fuel nozzles, the plurality of fuel nozzles comprising a plurality of duplex fuel nozzles and a plurality of simplex fuel nozzles, the duplex fuel nozzles being structurally different from the simplex fuel nozzles, each fuel nozzle of the plurality of fuel nozzles comprising:
a distal tip,
wherein the distal tip comprises:
a tubular portion;
a distal portion; and
a conical portion concentrically orientated and axially disposed between the tubular portion and the distal portion;
a plurality of fuel spray apertures circumferentially spaced from one another and communicating through the conical portion and configured to produce a fuel spray into a combustion chamber,
the distal portion projecting in a direction of and being recessed from a downstream rim of the plurality of swirlers corresponding with the plurality of fuel nozzles,
an immersion depth measured between the distal portion of the distal tip and the downstream rim,
wherein the immersion depth comprises less than 0.500 inches, wherein the combustor comprises four nozzle groupings that are circumferentially disposed relative to an axis of the combustor, wherein a first nozzle grouping of the nozzle groupings and a third nozzle grouping of the nozzle groupings each comprise six of the plurality of duplex fuel nozzles, wherein a second nozzle grouping of the nozzle groupings and a fourth nozzle grouping of the nozzle groupings each comprise three of the plurality of simplex fuel nozzles, and that are circumferentially located between the first nozzle grouping and the third nozzle grouping.

2. The combustor of claim 1, wherein the fuel spray apertures are angled at least partially radially outward and at least partially axially along a centerline of the plurality of fuel nozzles.

3. The combustor of claim 1, wherein each of the plurality of fuel nozzles comprises a distal aperture communicating through a planar portion of the distal tip and configured to produce a fuel spray along a centerline of the plurality of fuel nozzles.

4. The combustor of claim 1, wherein the first nozzle grouping is diametrically opposed to the third nozzle grouping, and wherein the second nozzle grouping is diametrically opposed to the fourth nozzle grouping.

5. The combustor of claim 1, wherein the second nozzle grouping is adjacent to each of the first nozzle grouping and the third nozzle grouping on one side of the combustor, and wherein the fourth nozzle grouping is adjacent to each of the first nozzle grouping and the third nozzle grouping on an opposite side of the combustor.

6. The combustor of claim 1, wherein each swirler of the plurality of swirlers converges relative to a centerline of the corresponding fuel nozzle of the plurality of fuel nozzles proceeding to the downstream rim, and wherein the downstream rim of each swirler of the plurality of swirlers defines an open discharge end.

7. A combustor comprising a plurality of fuel nozzles comprising a distal tip,
wherein the distal tip comprises:
a tubular portion;
a distal portion; and
a conical portion concentrically orientated and axially disposed between the tubular portion and the distal portion;
a plurality of fuel spray apertures spaced from one another and communicating through the conical portion and configured to produce a fuel spray into a combustion chamber of the combustor,
an immersion depth measured between the distal portion of the distal tip and a downstream rim of a corresponding swirler of the combustor, the distal portion projecting in a direction of and being recessed from a downstream rim of the corresponding swirler,
wherein the immersion depth is no more than about 0.500 inches,
wherein the combustor comprises a first nozzle grouping, a second nozzle grouping, a third nozzle grouping, and a fourth nozzle grouping, wherein the first nozzle grouping and the third nozzle grouping each include a common first number of a plurality of duplex nozzles of the plurality of plurality of fuel nozzles, wherein the second nozzle grouping and the fourth nozzle grouping each include a common second number of a plurality of simplex nozzles of the plurality of fuel nozzles, wherein the plurality of simplex nozzles are structurally different from the plurality of duplex nozzles, and wherein the first number is of a different magnitude than the second number.

8. The combustor of claim 7, wherein the immersion depth is from between about 0.250 inches to about 0.500 inches.

9. The combustor of claim 7, wherein the first nozzle grouping, the second nozzle grouping, the third nozzle grouping, and the fourth nozzle grouping are collectively disposed in a circumferential arrangement.

10. The combustor of claim 9, wherein the second nozzle grouping is disposed between the first nozzle grouping and the third nozzle grouping on one side of the circumferential arrangement, and wherein the fourth nozzle grouping is disposed between the first nozzle grouping and the third nozzle grouping on a different side of the circumferential arrangement.

11. The combustor of claim 10, wherein the first number for each of the first nozzle grouping and the third nozzle grouping of the plurality of duplex nozzles is larger than the second number for each of the second nozzle grouping and the fourth nozzle grouping of the plurality of simplex nozzles.

12. The combustor of claim 10, wherein the first nozzle grouping and the third nozzle grouping are disposed in opposing relation in the circumferential arrangement, and wherein the second nozzle grouping and the fourth nozzle grouping are disposed in opposing relation in the circumferential arrangement.

13. The combustor of claim 12, wherein the first number for each of the first nozzle grouping and the third nozzle grouping of the plurality of duplex nozzles is larger than the second number for each of the second nozzle grouping and the fourth nozzle grouping of the plurality of simplex nozzles.

14. The combustor of claim 9, wherein the first nozzle grouping and the third nozzle grouping each include six duplex nozzles of the plurality of duplex nozzles, and wherein the second nozzle grouping and the fourth nozzle grouping each include three simplex nozzles of the plurality of simplex nozzles.

15. The combustor of claim 7, wherein the first number for each of the first nozzle grouping and the third nozzle grouping of the plurality of duplex nozzles is larger than the second number for each of the second nozzle grouping and the fourth nozzle grouping of the plurality of simplex nozzles.

16. The combustor of claim 15, wherein the first nozzle grouping and the third nozzle grouping of the plurality of duplex nozzles are disposed in opposing relation to one another, and wherein the second nozzle grouping and the fourth nozzle grouping of the plurality of simplex nozzles are disposed in opposing relation to one another.

17. The combustor of claim 7, wherein the first nozzle grouping and the third nozzle groupings each include six duplex nozzles of the plurality of duplex nozzles, and wherein the second nozzle grouping and the fourth nozzle grouping each include three simplex nozzles of the plurality of simplex nozzles.

18. The combustor of claim 17, wherein the first nozzle grouping and the third nozzle grouping of the plurality of duplex nozzles are disposed in opposing relation to one another, and wherein the second nozzle grouping and the fourth nozzle grouping of the plurality of simplex nozzles are disposed in opposing relation to one another.

19. The combustor of claim 7, wherein the corresponding swirler of the combustor converges relative to a centerline of the fuel nozzle of the plurality of fuel nozzles proceeding to the downstream rim, and wherein the downstream rim of the corresponding swirler of the combustor defines an open discharge end.

\* \* \* \* \*